United States Patent
Shirota et al.

[11] Patent Number: 5,945,141
[45] Date of Patent: Aug. 31, 1999

[54] SCREW HEAD DEVICE FOR INJECTION MOLDING MACHINE

[75] Inventors: Makoto Shirota; Hiroshi Koizumi; Masahide Miyagawa, all of Nagano, Japan

[73] Assignee: Nissei Plastic Industrial Co., Ltd., Nagano-ken, Japan

[21] Appl. No.: 08/921,025

[22] Filed: Aug. 29, 1997

Related U.S. Application Data

[63] Continuation-in-part of application No. 08/841,760, Apr. 28, 1997, abandoned.

[51] Int. Cl.[6] ..................................................... B29C 45/18
[52] U.S. Cl. ................................. 425/563; 425/DIG. 224
[58] Field of Search ........................... 425/562, 563, 425/564, DIG. 224

[56] References Cited

U.S. PATENT DOCUMENTS 5,167,971 12/1992 Gill et al. .................................. 425/559
5,401,161  3/1995 Long ........................................ 425/563

FOREIGN PATENT DOCUMENTS 312531 2/1991 Japan .
384125 8/1991 Japan .

*Primary Examiner*—Jay H. Woo
*Assistant Examiner*—Robert Hopkins
*Attorney, Agent, or Firm*—Birch, Stewart, Kolasch & Birch, LLP

[57] ABSTRACT

A screw head device 1 for an injection molding machine includes a ring valve 3 set on a stem portion 2 of a screw head for movement in back and forth direction and for defining a rear side resin passage Rr between its own inner peripheral surface and the stem portion 2, a front side resin passage Rf extending axially and communicated with the rear side resin passage Rr, and a surge preventing mechanism, in which the front end of a screw main body Sm acts as a valve seat for mating with the rear end face of the ring valve 3. At a rear side of the head portion 4, a spacer guide 6 is provided. The outer peripheral surface 6s of the spacer guide 6 is located radially inside of the outer peripheral portion 4s of the head portions end racially outside of the bottom portion Rfd of the front side resin passage Rf. A front ring spacer 7 formed of a ceramic material, such as a boron alloy cermet, and having flat front and rear end faces 7f and 7r is set on the spacer guide 6 with mating the rear end face 7r with the ring valve 3. By this, the front ring spacer 7 is interposed between the 20 head portion 4 and the ring valve 3 to avoid wearing of the ring valve 3 by unevenness of the head portion.

20 Claims, 3 Drawing Sheets

SCREW HEAD DEVICE FOR INJECTION MOLDING MACHINE

This application is a continuation-in-part of application Ser. No. 08/841,760 filed on Apr. 28. 1997, abandoned the entire contents of which are hereby incorporated by reference.

BACKGROUND OF THE INVENTION

1. Field of the Invention

The present invention relates to a screw head device for an injection molding machine which has a surge preventing mechanism for preventing surge flow of a molten resin.

2. Description of the Related Art

Conventionally, there has been known a screw head device for an injection molding machine which has a surge preventing mechanism including a ring valve disposed for sliding in back and forth direction, for presenting surge flow of a molten resin. In such type of screw head device, the ring valve is shifted frontwardly upon metering of the molten resin and then, a plasticized or molten resin is fed through a resin passage defined between the inner peripheral surface of the ring valve and a step portion of the screw head to the front side of the tip end of the screw head for performing a metering operation. On the other hand, upon injection, the ring valve is shifted backward to prevent backward surge flow of the metered resin at the front side of the tip end of the screw head. In such screw head device, since the resin passage (back side resin passage) is certainly defined between the inner peripheral surface of the ring valve and the stem portion of the screw head, it becomes necessary to provide a front side resin passage extending from the back side resin passage to the tip end of the screw head. Japanese Unexamined Utility Model Publication (Kokai) No. Heisei 3(1991)-84125 discloses a screw head device of the type, in which the front side resin passage is formed in the ring valve. However, this type of screw head device requires forming a hole portion or uneven portion in the ring valve. Furthermore, since such hole portion or uneven portion is formed perpendicularly to an axial direction, it becomes necessary to make the portion forming the hole portion or the uneven portion thinner than the other portion. As a result, the ring valve inherently has a portion having lower mechanical strength than the portion at the front side. Furthermore, due to presence of the hole portion or the uneven portion, the shape and construction of the ring valve becomes complicated degrading workability.

On the other hand, another type of screw head device which does not encounter the problems set forth above, includes a front side resin passage formed in the screw head portion and extending in the axial direction. A device of this type has been proposed in Japanese Examined Patent Publication No. Heisei 3(1991)-12531, for example in the type of device where the front side resin passage is provided in the screw head, processing of the ring valve becomes unnecessary, since the unevenness is caused at the rear end of the head portion of the screw head due to presence of the front side resin passage. During metering of the molten resin, the uneven portion of the screw head inherently contacts with the ring valve under pressure while the screw head rotates, thereby causing wearing of the end surface of the ring valve, degrading durability of the ring valve.

SUMMARY OF THE INVENTION

In view of such problems, it is an object of the present invention to provide a screw head device for an injection molding machine, which can permit forming a front side resin passage on a screw head and prevent wearing of a ring valve to remarkably improve durability of the ring valve.

Another object of the present invention is to provide a screw head device for an injection molding machine which can simplify the configuration of parts to improve workability and to achieve lowering of cost.

In order to accomplish the above-mentioned object, a screw head device 1 for an injection molding machine includes a ring valve 3 set on a stem portion 2 of a screw head for movement in back and forth directions and for defining a rear side resin passage Rr between one inner peripheral surface and the stem portion 2, a front side resin passage Rf extending axially and communicated with the rear side resin passage Rr, and a surge preventing mechanism, in which the front end of a screw main body Sm as a valve seat for mating with the rear end face of the ring valve 3, at a rear side of the head portion 4, a spacer guide 6 being provided, the outer peripheral surface 6s of the spacer guide 6 being located radially inside of the outer peripheral portion 4s of the head portion 4 and radially outside of the bottom portion Rfd of the front side resin passage Rf, and a front ring spacer 7 having flat front and rear end faces 7f and 7r being set on the spacer guide 6 mating the rear end face 7r with the ring valve 3. The front ring spacer 7 may be constructed of a ceramic material or a boron alloy material, but is most preferably constructed of a boron alloy cermet.

In this case, the front side resin passage Rf is defined by forming a plurality of axially extending grooves arranged circumferentially with a regular angular interval. On the other hand, the spacer guide portion 6 is set in a length long enough to maintain overlap between the front ring spacer 7 and the spacer guide portion 6 even at the rearmost position of the front ring spacer 7. The front ring spacer 7 is formed into a cylindrical shaped configuration. On the other hand, at the front end of the screw main body Sm, a rear ring space 8 with flat front and rear end faces is mounted. The rear ring spacer 8 may be constructed of a ceramic material or a boron alloy material, but is most preferably constructed of a boron alloy cermet.

By this, upon metering, by rotation of the screw main body Sm, the resin is plasticized. The plasticized resin is fed forward by the screw head in per se known manner to cause frontward shifting of the ring valve 3 as shown in FIG. 1. At this position, the ring valve 3 is shifted way from the rear ring spacer 8 which serves as a valve seat for the former. Thus, the rear side resin passage Rr is opened. Thus, the resin is fed to the front side of the head portion 4 of the screw head 4 through the rear side resin passage Rr and the front side resin passage Rf. At this time, the head portion 4 is driven to rotate together with the screw main body Sm. However, since the front side resin spacer 7, formed of a boron alloy cermet, is interposed between the head portion 4 and the ring valve 3 to serve as a sheet bearing, even in the type of device where the front side resin passage Rf is formed in the screw head, the ring valve 3 will never be worn by the unevenness on the head portion 4.

On the other hand, upon injection, the screw main body Sm is moved forward to inject and fill the metered resin into a mold. At this time, as shown in FIG. 2, the ring valve 3 is shifted rearwardly by a pressure of the metered resin so that the rear end face of the ring valve 3 is held in contact with the front end face 8f of the rear side resin spacer 8 to block the rear side resin passage Rr. By this, backward surge flow of the resin can be successfully prevented. Also, by mounting the rear ring spacer 8, formed of a boron alloy cermet, having the flat front end rear end faces 8f and 8r, the rear ring spacer 8 serves as the valve seat for the ring valve to avoid wearing of the ring valve 3 and the screw main body Sm.

BRIEF DESCRIPTION OF THE DRAWINGS

The present invention will be understood more fully from the detailed description given hereinafter and from the accompanying drawings of the preferred embodiment of the present invention, which, however, should not be taken of the limitative to be present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention It will be obvious, however, to those skilled in the art that the present invention may be practiced without these specific details. In other instances, well-known structures are not shown in detail in order to avoid unnecessary obscuring of the present invention.

At first, a construction of the preferred embodiment of a screw head device 1 for an injection molding machine, according to the present invention will be discussed with reference to FIGS. 1 to 6.

Figure 1:
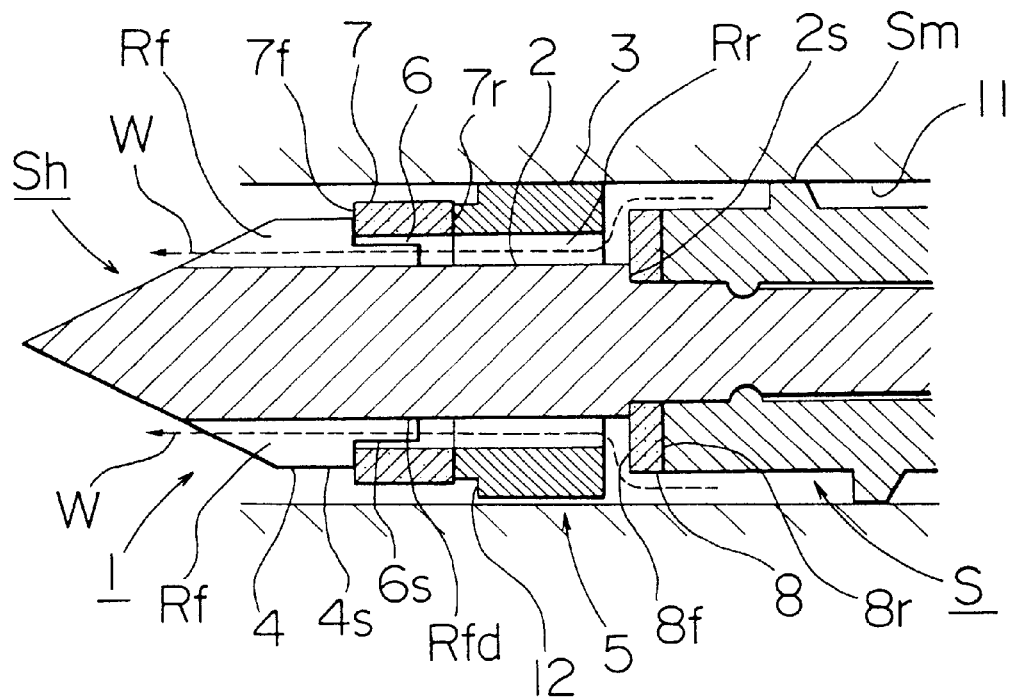
FIG. 1 is a sectional side elevation of the preferred embodiment of a screw head device according to the present invention, which is illustrated in a condition where a ring valve is shifted frontwardly.

In FIG. 1, S denotes a screw inserted into a heating cylinder in an injection molding machine. The screw S has a screw main body Sm. At the front end of the screw main body Sm, the preferred embodiment of a screw head device 1 is provided. The screw head device 1 is constructed with a screw head Sh, a ring valve 3, a front ring spacer 7 and a rear ring spacer 8.

Figure 3:
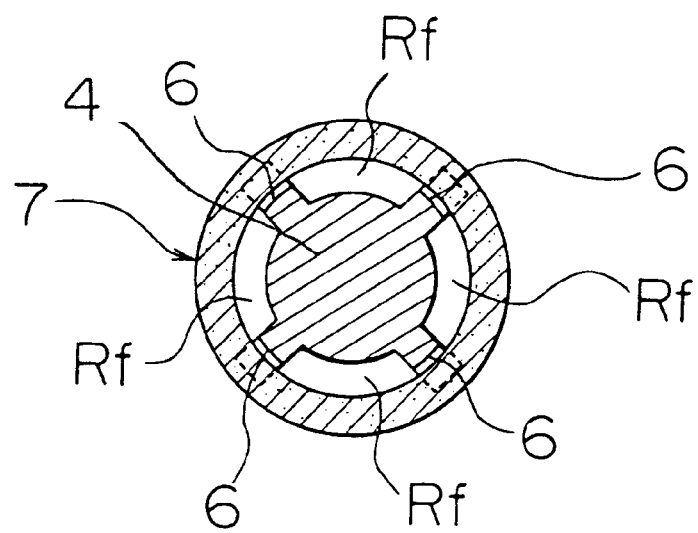
FIG. 3 is a section taken along line A—A of FIG. 2.

The screw head Sh is constructed with a stem portion 2 and a head portion 4 located at the front portion of the stem portion 2 and integrally formed therewith. On the outer periphery of the head portion 4, four grooves form front side resin passages Rf, as shown in FIGS. 1 and 3. In this case, respective of the front side resin passages Rf extend in parallel to a longitudinal axis. On the other hand, the four front side resin passages Rf are arranged circumferentially within regular angular intervals. On the other hand, at the rear portion of the head portion 4, a spacer guide portion 6 is integrally formed. The spacer guide 6 has an outer peripheral surface 6s located radially inside of the outer peripheral surface 4s of the head portion 4 and, in conjunction therewith, located radially outside the bottom portions Rfd of the front side resin passages Rf. The axial length of the spacer guide portion 6 is sufficiently long so that even at the rearmost position of a front ring spacer 7, at least partial overlap between the spacer guide portion 6 and the front ring spacer 7 can be maintained.

Figure 4:
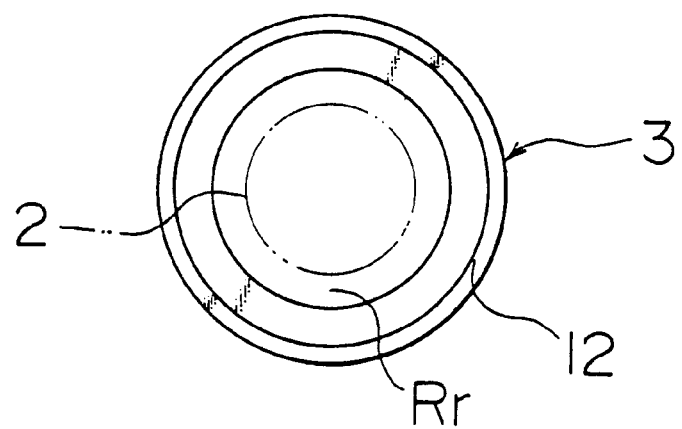
FIG. 4 is a front elevation of the ring valve in the preferred embodiment of the screw head device according to the present invention.

On the other hand, as shown in FIGS. 3 and 4, the ring valve 3 is formed of a steel material in a ring shape (or cylindrical shape). In this case, the internal and external diameters of the ring valve are selected so that a rear side resin passage Rr can be defined between the inner peripheral surface of the ring valve 3 and the stem portion 2 of the screw head. A step portion 12 may be formed on the outer periphery of the ring valve 3 with a smaller external diameter portion located at the head portion 4 side of the step portion 12. It should be noted that the step portion 12 is not essential to the present invention and the ring valve 3 may have a uniform outer peripheral surface without providing the step portion 12.

Figure 5:
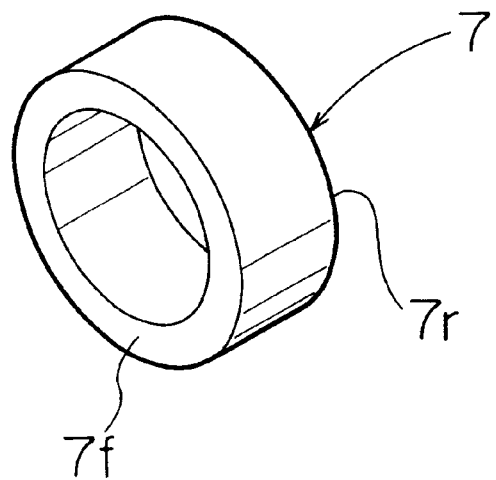
FIG. 5 is a perspective view of a front ring spacer in the preferred embodiment of the screw head device according to the present invention.

As shown in FIGS. 1, 3 and 5, the front ring spacer 7 is formed into a simple ring (cylindrical) shape and has front and rear end faces 7f and 7r. In this case, the front ring spacer is integrally formed of a ceramic material, such as $Si_3N_4$, or more preferably the front ring spacer is integrally formed of a boron alloy material, preferably a boron alloy cermet.

Figure 6:
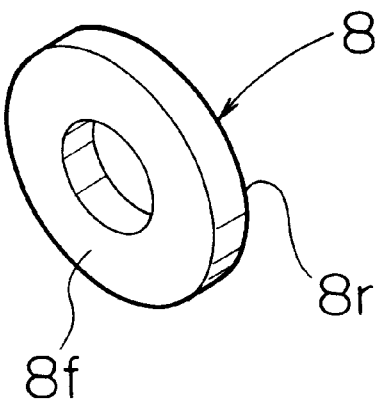
FIG. 6 is a perspective view of a rear ring spacer in the preferred embodiment of the screw head device according to the present invention.

As shown in FIGS. 1 and 6, a rear spacer ring 8 is formed into a simple ring shape, or an annular disc shape and has front and rear ends 8f and 8r. In this case, the rear ring spacer is integrally formed of a ceramic material, such as $Si_3N_4$, or more preferably the rear ring spacer is integrally formed of a boron alloy material, preferably a boron alloy cermet.

Thus, as shown in FIG. 1, by inserting the stem portion 2 through the front ring spacer 7, the ring valve 3 and the rear ring spacer 8 and by setting the rear portion of the stem portion 2 at the front end portion of the screw main body Sm, the rear ring spacer 8 is fixed on the front end of the screw main body Sm with a stem portion 2s of the step portion 2. The ring valve 3 is set slidably in a back-and-forth direction. The rear side resin passage Rr is then defined between the inner peripheral surface of the ring valve 3 and the step portion 2 of the screw head. Also, the front ring spacer 7 is set on the spacer guide portion 6. By this, the preferred embodiment of the screw head device with the surge preventing mechanism, according to the present invention, can be constructed.

Figure 2:
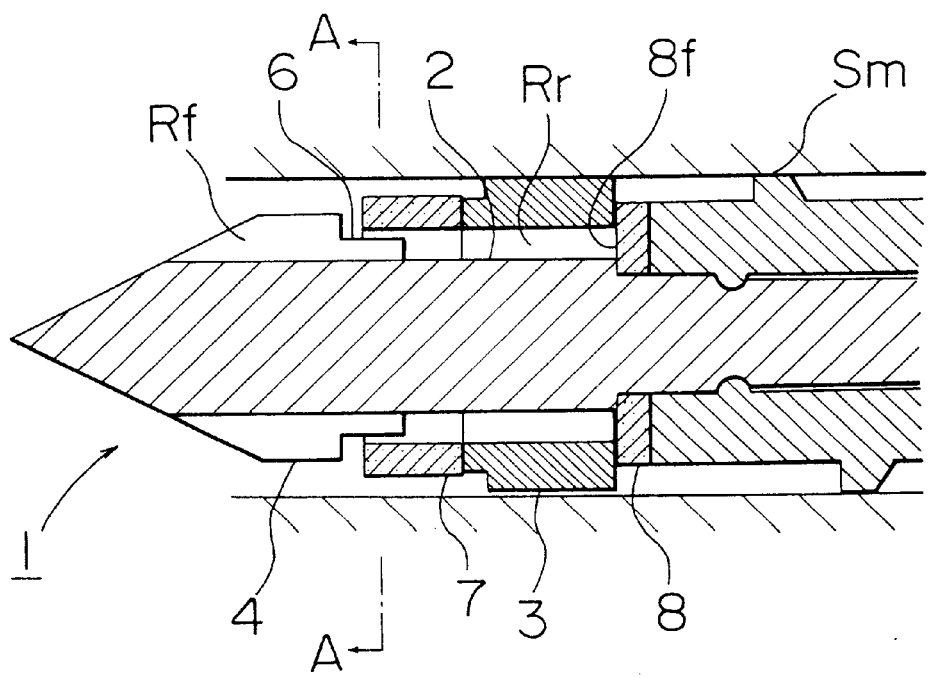
FIG. 2 is a sectional side elevation of the preferred embodiment of the screw head device according to the present invention, which is illustrated in a condition where the ring valve is shifted rearwardly.

Next, the function of the embodiment of the screw head device according to the present invention will be discussed with reference to FIGS. 1 and 2.

At first, upon metering, by rotation of the screw main body Sm, the resin is plasticized. The plasticized resin is fed forward by the screw head in per se known manner to cause frontward shifting of the ring valve 3 as shown in FIG. 1. At this position, the ring valve 3 is shifted away from the rear ring spacer 8 which serves as a valve seat for the former. Thus, the rear side resin passage Rr is opened and, the resin is fed to the front side of the head portion 4 of the screw head 4 through the rear side resin passage Rr and the front side resin passage Rf.

At this time, the head portion 4 is driven to rotate together with the screw main body Sm. However since the front ring spacer 7 is interposed between the head portion 4 and the ring valve 3 to serve as a sheet bearing, even in the type of device where the front side resin passage Rf is formed in the screw head, the ring valve 3 will never be worn by unevenness on the head portion 4.

On the other hand, upon injection, the screw main body Sm is moved forward to inject and fill the metered resin into a mold. At this time, as shown in FIG. 2, the ring valve 3 is shifted rearwardly by a pressure of the metered resin so that the rear end face of the ring valve 3 is held in contact with the front end face 8f of the rear ring spacer 8 to block the rear side resin passage Rr. By this, backward surge flow of the resin can be successfully prevented Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, it should be noted that the rear ring spacer is optional and not essential for the present invention. Therefore, the rear ring spacer may be provided as required.

What is claimed is:

1. A screw head device for an injection molding machine comprising:
    a screw main body;
    a screw head;
    a stem portion on said screw head;
    a ring valve set around said stem portion movable in back and forth directions, said ring valve defining a rear side resin passage between an inner peripheral surface of said ring valve and said stem portion;
    a head portion on said screw head;
    means for defining a front side resin passage in said head portion in communication with said rear side resin passage;
    a surge preventing mechanism including a portion of said screw main body serving as a valve seat for said ring valve for preventing surge flow of a material resin;
    a spacer guide provided at a rear side of said head portion and having an outer peripheral surface located at a position radially inside an outer peripheral surface of said head portion and radially outside a bottom of said front side resin passage; and
    a front ring spacer positioned radially outside of and movable axially with respect to said spacer guide and having flat front and rear end faces, said rear end face being in contact with an axial end face of said ring valve.

2. The screw head device as set forth in claim 1, wherein said front side resin passage is defined by a plurality of axially extending grooves arranged in a circumferential direction with a regular angular interval, said axially extending grooves being formed in said head portion and said spacer guide.

3. The screw head device as set forth in claim 1, wherein said spacer guide is long enough to maintain overlap with said front ring spacer even when said front ring spacer is moved to a rearmost position.

4. The screw head device as set forth in claim 1, wherein said front ring spacer is formed in a cylindrical shape.

5. The screw head device as set forth in claim 1, which further comprises a rear ring spacer mating with the front end of said screw main body and having flat front and rear end faces.

6. The screw head device as set forth in claim 5, wherein said rear ring spacer is formed into the shape of an annular disc, said ring valve directly contacting said rear ring spacer when said ring valve is in a rearward position.

7. The screw head device as set forth in claim 1, wherein said front ring spacer is made of a ceramic material.

8. The screw head device as set forth in claim 1, wherein said front ring spacer is made of a boron alloy material.

9. The screw head device as set forth in claim 8, wherein said boron alloy material is a boron alloy cermet.

10. The screw head device as set forth in claim 5, wherein said rear ring spacer is made of ceramic material.

11. The screw head device as set forth in claim 5, wherein said rear ring spacer is made of a boron alloy material.

12. The screw head device as set forth in claim 11, wherein said boron alloy material is a boron alloy cermet.

13. A screw head device for an injection molding machine comprising:
    a screw main body;
    a screw head having a stem portion, a head portion, and a spacer guide integrally formed thereon;
    a plurality of axially extending grooves formed in said head portion and said spacer guide of said screw head, said grooves forming a front side resin passage;
    a ring valve mounted on said stem portion movable axially between backward and forward positions, a rear side resin passage being defined by an inside surface of said ring valve and an outside surface of said stem portion of said screw head; and
    a front ring spacer mounted on said stem portion movable axially between backward and forward positions with respect to said spacer guide.

14. The screw head device as set forth in claim 13, wherein said spacer guide is long enough to maintain overlap with said front ring spacer even when said front ring spacer is moved to the backward position.

15. The screw head device as set forth in claim 13, wherein said front ring spacer is formed in a cylindrical shape.

16. The screw head device as set forth in claim 13, which further comprises a rear ring spacer mating with the front end of said screw main body and having flat front and rear end faces.

17. The screw head device as set forth in claim 16, wherein said rear ring spacer is formed into an annular disc.

18. The screw head device as set forth in claim 13, wherein said front ring spacer is made of a ceramic material.

19. The screw head device as set forth in claim 13, wherein said front ring spacer is made of a boron alloy material.

20. The screw head device as set forth in claim 13, wherein said boron alloy material is a boron alloy cermet.

* * * * *